(12) United States Patent
Coyez et al.

(10) Patent No.: US 10,533,426 B2
(45) Date of Patent: Jan. 14, 2020

(54) METHOD FOR MANUFACTURING A TURBINE ENGINE BLADE INCLUDING A TIP PROVIDED WITH A COMPLEX WELL

(71) Applicant: Safran Aircraft Engines, Paris (FR)

(72) Inventors: Dominique Coyez, Conflans Sainte Honorine (FR); Christian Bariaud, Orsay (FR); Sami Benichou, Le Blanc Mesnil (FR); Jean-Claude Marcel Auguste Hanny, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 231 days.

(21) Appl. No.: 15/536,475

(22) PCT Filed: Dec. 15, 2015

(86) PCT No.: PCT/FR2015/053517
§ 371 (c)(1),
(2) Date: Jun. 15, 2017

(87) PCT Pub. No.: WO2016/097586
PCT Pub. Date: Jun. 23, 2016

(65) Prior Publication Data
US 2017/0328222 A1 Nov. 16, 2017

(30) Foreign Application Priority Data
Dec. 17, 2014 (FR) ...................................... 14 62614

(51) Int. Cl.
*B22C 9/10* (2006.01)
*B22C 9/24* (2006.01)
(Continued)

(52) U.S. Cl.
CPC ................ *F01D 5/187* (2013.01); *B22C 9/10* (2013.01); *B22C 9/108* (2013.01); *B22C 9/24* (2013.01);
(Continued)

(58) Field of Classification Search
CPC .. B22C 9/04; B22C 9/10; B22C 9/108; B22C 9/24; B22D 25/02; B22D 29/002; F01D 5/18; F01D 5/187
See application file for complete search history.

(56) References Cited

U.S. PATENT DOCUMENTS 5,599,166 A * 2/1997 Deptowicz ................ B22C 9/04
164/369
5,975,851 A * 11/1999 Liang ...................... F01D 5/186
416/97 R
(Continued)

FOREIGN PATENT DOCUMENTS

EP 1 754 555 A1 2/2007

OTHER PUBLICATIONS

International Search Report issued in Application No. PCT/FR2015/053517 dated Mar. 15, 2016.
(Continued)

*Primary Examiner* — Kevin E Yoon
(74) *Attorney, Agent, or Firm* — Pearne & Gordon LLP

(57) ABSTRACT

A method for manufacturing a turbine engine blade (25) comprising a pressure side and a suction side separated from one another by an inner space for the circulation of cooling air, the blade (25) comprising a tip (S) with a closing wall (29) joining the pressure side and suction side walls in the region of this tip (S) in order to define a well shape, the closing wall including through-holes. The closing wall (29) obtained by moulding has a considerable nominal thickness with pits (36, 37) locally reducing this thickness at each
(Continued)

through-hole in order to facilitate the removal by chemical etching of alumina rods defining the holes. Since the closing wall (29) thus has a large nominal thickness, it can then be machined in order to form raised patterns or complex shapes inside the well.

4 Claims, 3 Drawing Sheets

(51) Int. Cl.
    *B22C 9/04*     (2006.01)
    *F01D 5/18*     (2006.01)
    *B22D 29/00*     (2006.01)
    *F01D 5/28*     (2006.01)

(52) U.S. Cl.
    CPC ............. *B22D 29/002* (2013.01); *F01D 5/28* (2013.01); *B22C 9/04* (2013.01); *F05D 2230/211* (2013.01); *F05D 2240/307* (2013.01); *F05D 2300/17* (2013.01); *Y02T 50/673* (2013.01); *Y02T 50/676* (2013.01)

(56) References Cited

U.S. PATENT DOCUMENTS

| | | | |
|---|---|---|---|
| 6,637,500 B2 * | 10/2003 | Shah | ........................ B22C 9/04 |
| | | | 148/404 |
| 7,562,691 B2 | 7/2009 | Guerche | |
| 2008/0145234 A1 * | 6/2008 | Lee | ........................ B22C 9/103 |
| | | | 416/96 R |

OTHER PUBLICATIONS

Written Opinion issued in Application No. PCT/FR2015/053517 dated Mar. 15, 2016.
Search Report issued in French Patent Application No. 1462614 dated Oct. 7, 2015.

* cited by examiner

METHOD FOR MANUFACTURING A TURBINE ENGINE BLADE INCLUDING A TIP PROVIDED WITH A COMPLEX WELL

TECHNICAL FIELD

The invention relates to the manufacturing of a blade of an aircraft engine of the turbine engine type, such as for example a turbojet engine or a turboprop.

PRIOR ART

In such an engine, marked by 1 in FIG. 1, the air is admitted into an inlet sleeve 2 in order to pass through a blower comprising a series of rotating blades 3 before being separated into a central primary flow and a secondary flow surrounding the primary flow.

The primary flow is compressed by turbines 4 and 6 before reaching a combustion chamber 7, after which it is expanded by passing through turbines 8, before being removed by generating a thrust. The secondary flow is propelled directly by the blower in order to generate an additional thrust.

Each turbine 8 comprises a series of blades oriented radially and regularly spaced about a rotation shaft AX carried by an external casing 9 surrounding the unit.

The cooling of the blades is provided by circulating in each blade air taken upstream of the combustion and admitted at the blade root, with this air being evacuated by bores passing through the walls of these blades.

Such a blade, which is marked as 11 in FIG. 2, comprises a root P through which it is fastened to a rotating body, and a vane 12 carried by this root P, with the root and the vane being separated by a platform 13.

The vane 12 has a left twisted shape about an axis EV referred to as spanwise axis which is perpendicular to the axis AX. It includes a base through which it is connected to the platform 13 and which is extended radially to a tip S which is the free end of this vane. The two main walls of the vane are its pressure side wall 14 and its suction side wall which are separated from one another.

The tip S of the blade 11 comprises a closing wall perpendicular to the direction EV, and which connect the pressure side and suction side walls. This closing wall which cannot be seen in FIG. 2 is set back towards the axis AX with respect to the free ends of the pressure side and suction side walls. It jointly delimits with these edges a hollow portion open in the direction opposite the axis AX, called well which located at the head of the blade.

Such a blade is manufactured by moulding a metal material, by using in particular a first and a second core 17 and 18 in order to delimit its inner space and the zone as a well, as illustrated diagrammatically in FIG. 3. These two cores 17 and 18 are spaced apart from one another along the spanwise direction EV by a short distance, noted as d, and which corresponds to the closing wall marked by 19 in FIG. 3.

The second core 18 is passed through by alumina rods 21 parallel to the axis EV, which pass through the region of the closing wall 19, and of which the ends are taken in the first core 17. These rods on the one hand make it possible to maintain these cores in position with respect to one another during the casting operation, and they make it possible on the other hand to form holes that provide for dust removal when the blade is then in operation.

After casting and cooling of the alloy that comprises the blade, the cores 17 and 18 are removed by chemical etching, which leads to the situation of FIG. 4, wherein portions of alumina rods passing through the closing wall 19 still subsistent. The removal of the portions of the remaining alumina rods, called shakeout, is carried out with a second chemical etching.

The blade is then, as can be seen in FIG. 5, completely cleared of the artifices that were used for the moulding thereof, and it has at its closing wall 19 two through-holes 22 corresponding to the removed alumina rods. These holes 22 are the holes for dust removal which ensure the evacuation of any dust in order to prevent it from accumulating inside the blade when the latter is in operation.

The increased needs in terms of performance lead to optimising the cooling of the well, by providing for example ribs or inner partitions carried by the well bottom, i.e. the closing wall 19. These partitions or ribs marked by 23 and 24 in the symbolic example of FIG. 6 aim to optimise the aerodynamism in the well in order to subject therein the flow of air in order to homogenise the cooling thereof.

Adding such ribs or partitions substantially complicates the elaboration of the second core made of ceramic 18. Indeed, the latter is manufactured with a core box, i.e. a mould in two portions that open by separating one from the other, but according to a direction of unmoulding and which extends in a plane normal to the spanwise axis of the vane. This direction of unmoulding is shown by the arrows F in FIG. 6.

The constraint of this direction of unmoulding, which is the result of manufacturing imperatives, makes it that the slots that delimit the ribs for the bottom of the well cannot be provided at the end of the second core. Such slots would form undercuts making it impossible to unmould the second core during the manufacturing thereof, due to the fact that their orientations differ from the direction of unmoulding.

A possibility would consist in manufacturing a second core in several portions of ceramic assemblies one with the other by gluing. This substantially complicates the manufacture and tends consequently to increase the scrap rate.

The object of the invention is to provide a method for manufacturing that makes it possible to carry out a large variety of internal shapes on the well without penalising the cost and the scrap rate.

DISCLOSURE OF THE INVENTION

To this effect, the invention has for object a method for manufacturing a turbine engine blade comprising a pressure side wall and a suction side wall separated from one another by an inner space for the circulation of cooling air, with this blade comprising a tip with a closing wall joining the pressure side and suction side walls in the region of this tip in order to define a well shape, with this closing wall comprising through-holes, with the method comprising a step of moulding that implements a core delimiting the shape as a well and alumina rods delimiting each through-hole, a chemical etching operation of the core and a chemical etching operation of the alumina rods in order to remove this core and these rods after moulding, characterised in that the core is provided with bosses at each through-hole in order to confer upon the closing wall such as obtained by moulding a nominal thickness greater than the thickness of these other walls of the blade and a reduced thickness at each through-hole, and in that the method comprises a machining operation of the closing wall in order to form a raised pattern or patterns at the bottom of the well.

This method of manufacturing as such makes it possible to manufacture a blade comprising a well having a complex internal shape without involving a fundamental modification of the operations and tools concerning the moulding of the untreated part from which the blade is formed.

The invention also relates to a method defined as such, wherein the core is conformed to confer upon the closing wall a nominal thickness and a reduced thickness on through-holes which are such that the ratio of the nominal thickness over the reduced thickness is greater than or equal to 2.5.

The invention also relates to a method defined as such, wherein the core is conformed to confer upon the closing wall thicknesses such that the ratio of the nominal thickness over the reduced thickness is greater than or equal to 5.

The invention also relates to a method defined as such, wherein the operation of machining the closing wall is arranged to form therein one or several ribs or inner partitions.

The invention also relates to means for moulding for the manufacturing of a blade defined as such, comprising a core box arranged to manufacture a core defined as such.

The invention also relates to a turbine engine turbine comprising a blade manufactured in accordance with a method defined as such.

The invention also relates to a turbine engine comprising a turbine defined as such.

DETAILED DESCRIPTION OF PARTICULAR EMBODIMENTS

Figure 1:
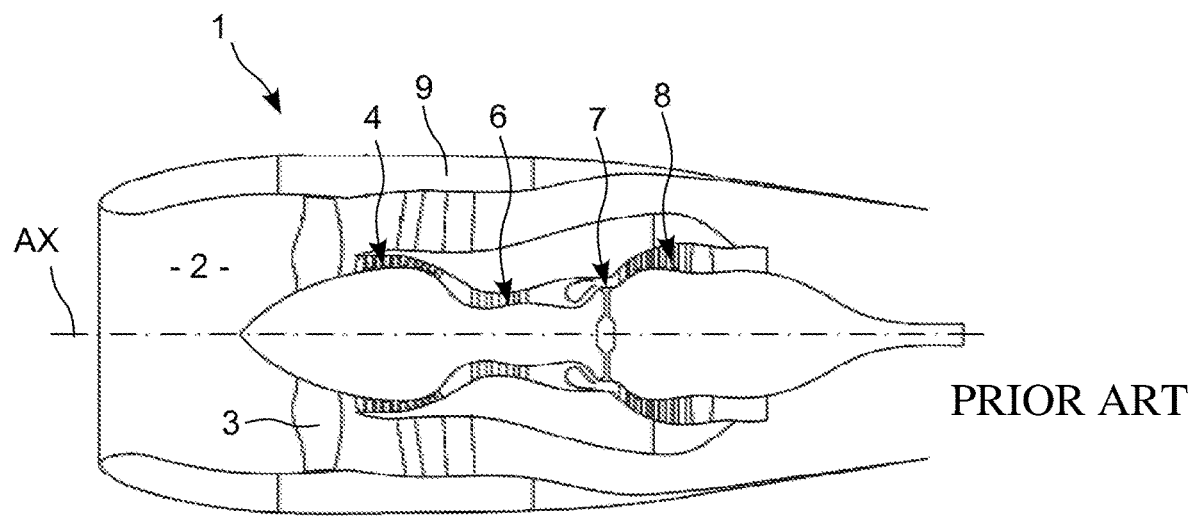
FIG. 1 already described is a general view of a turbofan engine shown as a lateral cross-section.
Figure 2:
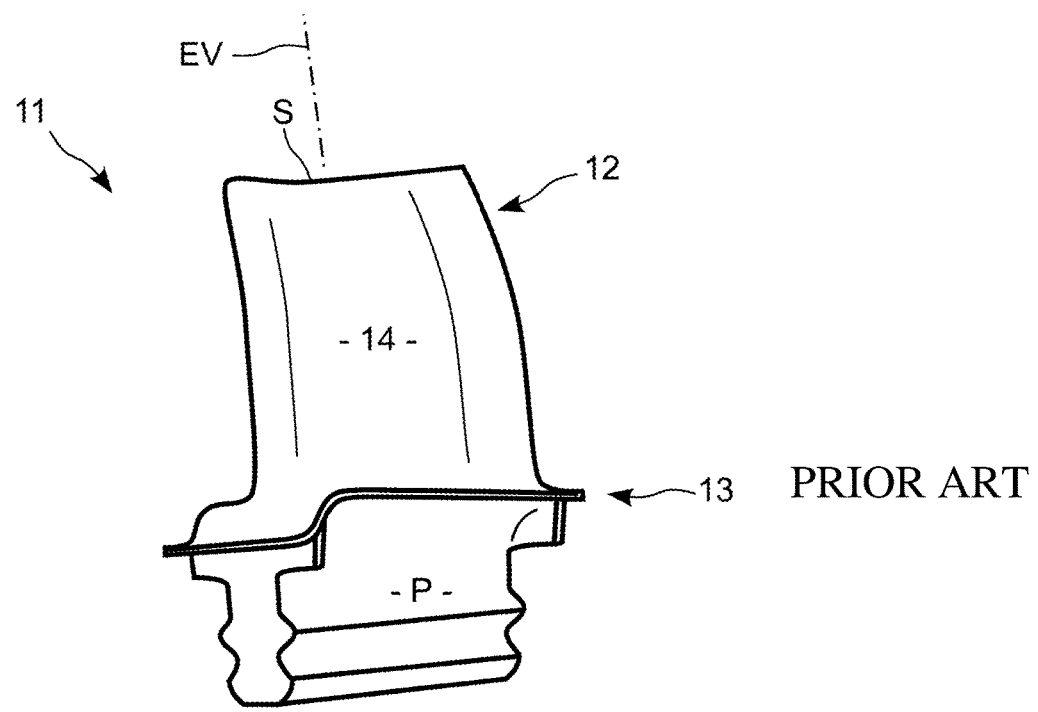
FIG. 2 already described is a general view of a reactor blade.
Figure 3:
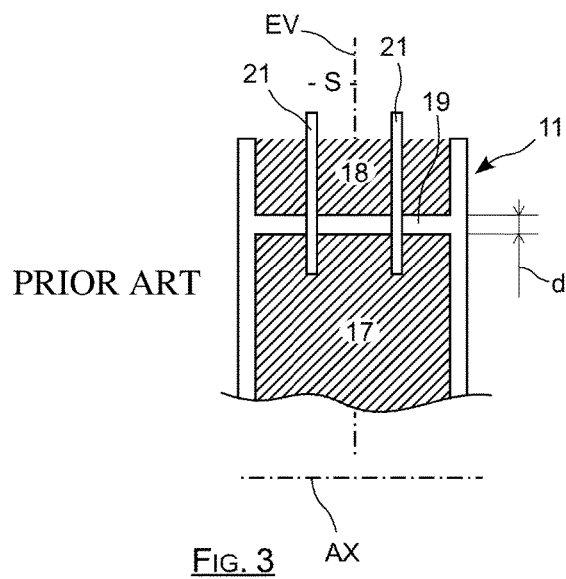
FIG. 3 already described is a cross-section view of a blade of the State of the art during the moulding thereof.
Figure 4:
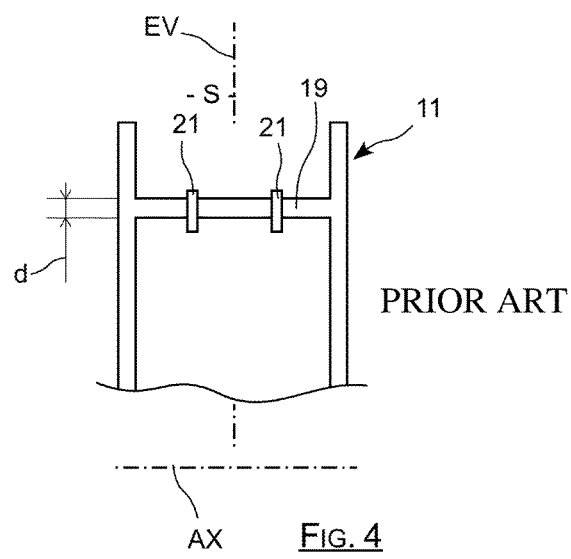
FIG. 4 already described is a cross-section of a blade of the State of the art after removal of the cores used for the moulding.
Figure 5:
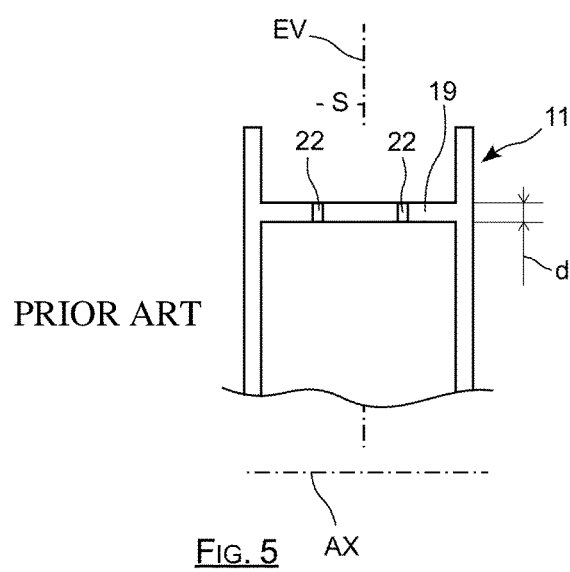
FIG. 5 already described is a cross-section view of a blade of the State of the art after removal of the alumina rods.
Figure 6:
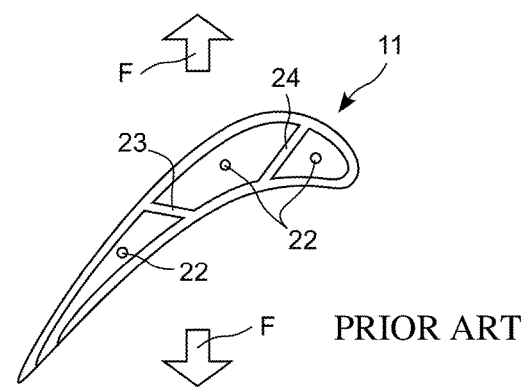
FIG. 6 is a top view of a blade well provided with additional inner ribs.
Figure 7:
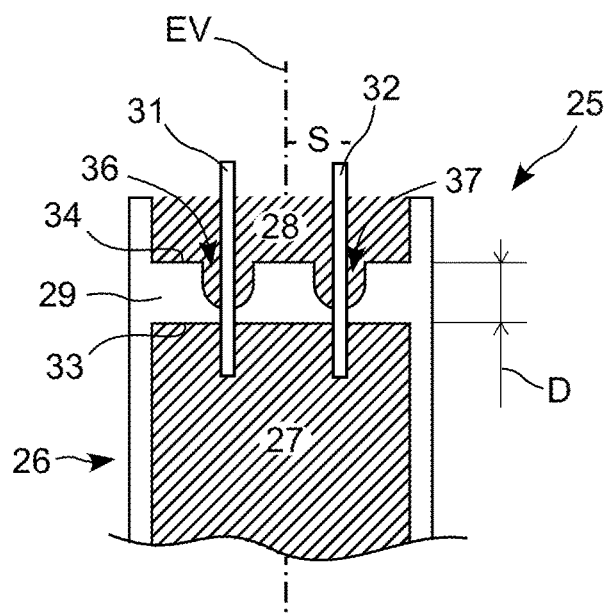
FIG. 7 is a cross-section view of a blade according to the invention during the moulding thereof.

The blade according to the invention, marked by 25 in FIG. 7 also comprises a vane 26 carried by a root and having a shape the globally corresponds to that of the blade of FIGS. 2 to 6. The terms lower and upper used in what follows are to be understood according to the orientation of the figures, wherein the vane is upwards and carried by a root located downwards although this is not shown.

Figure 8:
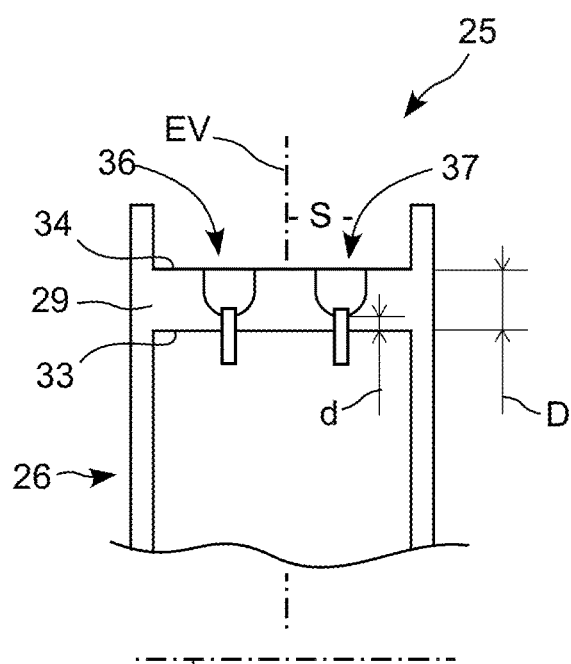
FIG. 8 is a cross-section view of a blade according to the invention after removal of the cores used for the moulding.
Figure 9:
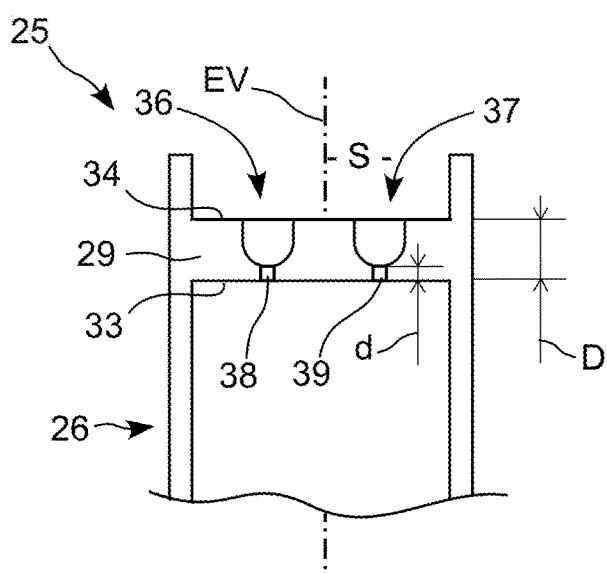
FIG. 9 is a cross-section view of a blade according to the invention after removal of the alumina rods.

This vane also comprises a pressure side wall and a suction side wall spaced apart from one another and which meet at the tip of the vane S by a closing wall marked as 29 in FIGS. 7 to 9. This closing wall is perpendicular to the spanwise direction EV of the vane and set back towards the axis AX of rotation of the vane, with respect to the free edges of the pressure side and suction side walls.

This closing wall delimits together with the free edges of the pressure side and of the suction side a hollow portion open in the direction opposite the axis AX, called a well.

The blade is here too manufactured by moulding of a metal material, with a first and a second core 27 and 28 delimiting the inner space and the well, as shown in FIG. 7. These two cores 27 and 28 are spaced apart from one another along the spanwise direction EV, in order to delimit the closing wall marked by 29.

This closing wall 29 here has a nominal thickness, noted as D, that is considerably higher than in the case of blades of the state of the art in such a way as to be able to be machined in order to form therein partitions or additional ribs such as those in FIG. 6.

This closing wall is passed through by two alumina rods 31, 32, taken in the two cores 27 and 28 in order to maintain them in position with respect to one another during the casting of the alloy constituting the blade itself.

After casting and cooling of the alloy, the cores 27 and 28 are removed by chemical etching, which leads to the situation of FIG. 8, where portions of alumina rods passing through the closing wall 29 still subsist. The removal of portions of the remaining alumina rods, called shakeout, is carried out with a second chemical etching, which as such makes it possible to completely clear the blade of the elements that were used for the moulding thereof.

In order to make the shakeout operation of the rods possible, the thickness of the closing wall 29 is reduced at each passage of alumina rod at a value noted as d, substantially lower than the nominal thickness D of this closing wall 29.

The thickness d which corresponds to the shakeout thickness is preferably greater than six tenths of a millimetre and less than eight tenths of a millimetre, while the nominal thickness of the wall 29 can be about two millimetres, and preferably greater than or equal to three millimetres.

As such, the ratio of the nominal thickness D of the closing wall 29 on the reduced thickness of this wall on each passage of alumina rod 31, 32 is greater than or equal to 2.5 and preferably greater than or equal to 5.

More particularly, the lower surface 33 of the closing wall 29, namely the surface that is closest to the axis AX and which gives onto the inner space of the blade is substantially planar, as well as the end of the core 27 which delimits this surface. The upper surface 34 of this wall, namely the farthest from the axis AX and which delimits the bottom of the well, comprises on the contrary a hollow or pit on each passage of the alumina rod, with these pits being marked by 36 and 37.

As shown in the figures, this particular shape of the upper surface, with pits, is the result of two raised patterns or corresponding bosses carried out at the end of the core 28 on each passage of alumina rod. These bosses can be obtained simply by carrying out recesses on the corresponding zone of the core box, i.e. of the mould, used for the manufacture of the second core.

Each pit can have a tapered conical cylindrical shape or other in order to constitute for the shakeout operation a reservoir that receives the shakeout liquid which is a basic bath. The thickness of the wall on the bottom of each pit, noted as d, corresponds to the maximum thickness possible in order to ensure the shakeout of the rods.

In the example of the figures, each pit comprises a hemispherical bottom extended by a cylindrical flank, but different shapes can be considered, according in particular to the constraints due to the moulding process which is provided for the manufacture of the untreated part intended to form the blade.

As shown diagrammatically in FIGS. 8 and 9, thanks to the pits 36 and 37 the closing wall 29 has a low thickness locally on each passage of alumina rod in order to allow for the removal of these rods via chemical etching with bases in order to form the corresponding dust removal holes, marked by 38 and 39.

The crude blade that is shown in FIG. 9 as such shown a well at its tip, but of which the bottom has a considerable nominal thickness. It is as such possible to form in this bottom 29 ribs or partitions of complex shapes such for example those of FIG. 6, simply by matching the bottom of the well.

In other words, the invention makes it possible to manufacture a blade that has at its tip a well of which the inside region can be provided with practically any type of rib, artifice, flow disturber or other, without however complicating the moulding process. Indeed, thanks to the bosses 36, 37 provided at the end of the second core 28, the closing wall 29 can have a high nominal thickness without requiring a specific process for removing the alumina rods from this closing wall after moulding. The invention as such makes it possible to manufacture a blade with a complex well without penalising the moulding and manufacturing process of the cores.

What is claimed is:

1. Method for manufacturing a turbine engine blade (25) comprising a pressure side wall and a suction side wall separated from one another by an inner space for the circulation of cooling air, this blade (25) comprising a tip (S) with a closing wall (29) joining the pressure side and suction side walls in the region of this tip (S) in order to define a well shape, this closing wall (29) comprising through-holes (38, 39), with the method comprising a step of moulding implementing a core (28) delimiting the shape as a well and alumina rods (31, 32) delimiting each through-hole (38, 39), a chemical etching operation of the core (28) and a chemical etching operation of the alumina rods (31, 32) in order to remove this core and these rods after moulding, characterised in that the core (28) is provided with bosses at each through-hole (38, 39) in order to confer upon the closing wall (29) such as obtained by moulding a nominal thickness (D) greater than the thickness of the other walls of the blade and a reduced thickness (d) at each through-hole (38, 39), and in that the method comprises an operation of machining the closing wall (29) in order to form a raised pattern or patterns at the bottom of the well.

2. Method according to claim 1, wherein the core (18) is conformed to confer upon the closing wall a nominal thickness (D) and a reduced thickness (d) at through-holes (38, 39) which are such that the ratio of the nominal thickness (D) over the reduced thickness (d) is greater than or equal to 2.5.

3. Method according to claim 2, wherein the core (18) is conformed to confer upon the closing wall thicknesses (d, D) such that the ratio of the nominal thickness (D) over the reduced thickness (d) is greater than or equal to 5.

4. Method according to claim 1, wherein the machining operation of the closing wall is arranged to form therein one or several ribs or inner partitions.

* * * * *